US008523156B2

(12) United States Patent
Hou et al.

(10) Patent No.: US 8,523,156 B2
(45) Date of Patent: Sep. 3, 2013

(54) POSITIONING AND PRESSING DEVICE, PRESSING DEVICE AND TOOL FOR AUXILIARY MACHINING OF MOTOR TRAIN UNDERFRAME

(75) Inventors: Zhigang Hou, Hebei (CN); Jun Liu, Hebei (CN)

(73) Assignee: Tangshan Railway Vehicle Co., Ltd., Hebei (CN)

( * ) Notice: Subject to any disclaimer, the term of this patent is extended or adjusted under 35 U.S.C. 154(b) by 42 days.

(21) Appl. No.: 13/174,316

(22) Filed: Jun. 30, 2011

(65) Prior Publication Data

US 2011/0299952 A1 Dec. 8, 2011

Related U.S. Application Data

(63) Continuation of application No. PCT/CN2010/074795, filed on Jun. 30, 2010.

(30) Foreign Application Priority Data

Jun. 4, 2010 (CN) .......................... 2010 1 0193436

(51) Int. Cl.
*B23C 1/20* (2006.01)

(52) U.S. Cl.
USPC ............. 269/37; 269/165; 269/311; 269/909; 269/58; 29/281.1; 29/281.5

(58) Field of Classification Search
USPC ................. 248/687; 269/101, 102, 139, 165, 269/166, 228, 262, 271, 275, 291, 297, 311, 269/314, 37, 45, 58, 902, 904, 906, 909, 269/910, 95; 29/281.1, 281.4, 281.5; 409/175
IPC .................................... B23K 37/04; B25B 1/20
See application file for complete search history.

(56) References Cited

U.S. PATENT DOCUMENTS 1,113,700 A * 10/1914 Simpson et al. ................ 29/271
2,458,370 A * 1/1949 Geddes ........................... 269/45
2,991,669 A * 7/1961 Stock ............................ 269/154
4,140,355 A * 2/1979 Swain ........................ 312/330.1
4,691,905 A * 9/1987 Tamura et al. .................. 269/45

(Continued)

*Primary Examiner* — Lee D Wilson
*Assistant Examiner* — Tyrone V Hall, Jr.
(74) *Attorney, Agent, or Firm* — J.C. Patents

(57) ABSTRACT

The present invention provides a positioning and pressing device, a pressing device and a tool for auxiliary machining of motor train underframe, the positioning and pressing device comprises a crossbeam, two supporting frames, two rotary vertical pressing structures, a lateral positioning structure, a lateral holding structure and two adjustable intermediate supporting structures; the two supporting frames are mounted in sliding manner on two sides of the upper surface of the crossbeam; the two rotary vertical pressing structures are respectively mounted on the tops of the two supporting frames; the lateral positioning structure is mounted on the side of one of the two supporting frames; the lateral holding structure is mounted on the side of the other one of the two supporting frames; and the two adjustable intermediate supporting structures are mounted on the upper surface of the crossbeam and between the two supporting frames. The present invention realizes that the tool for the auxiliary machining of the motor train underframe is modularized; the present invention solves the technical problems of the present technology that the motor train underframe machining structure is large in volume and is not convenient for transportation and movement and the adjustability thereof is not good and not capable of meeting the requirements of the auxiliary machining of the motor train underframe with different types.

20 Claims, 11 Drawing Sheets

(56) References Cited

U.S. PATENT DOCUMENTS

| | | | | | |
|---|---|---|---|---|---|
| 4,867,427 | A | * | 9/1989 | Cunningham | 269/88 |
| 5,026,033 | A | * | 6/1991 | Roxy | 269/45 |
| 5,040,716 | A | * | 8/1991 | Stetz | 228/49.3 |
| 5,107,599 | A | * | 4/1992 | Marincic et al. | 33/573 |
| 5,181,702 | A | * | 1/1993 | Pettigrew | 269/93 |
| 5,305,992 | A | * | 4/1994 | Kish | 269/51 |
| 5,494,553 | A | * | 2/1996 | Colucci | 156/580 |
| 5,732,455 | A | * | 3/1998 | Diede | 29/281.5 |
| 5,816,568 | A | * | 10/1998 | Fox | 269/60 |
| 5,839,181 | A | * | 11/1998 | Chu | 29/281.5 |
| 5,901,426 | A | * | 5/1999 | Okazaki et al. | 29/407.08 |
| 6,775,893 | B2 | * | 8/2004 | Constantinescu | 29/281.5 |
| 6,889,968 | B1 | * | 5/2005 | Wong | 269/91 |
| 7,469,473 | B2 | * | 12/2008 | Savoy | 29/897.2 |
| 7,546,942 | B2 | * | 6/2009 | Monti et al. | 228/43 |
| 7,690,631 | B2 | * | 4/2010 | Rathjen | 269/296 |
| 8,210,510 | B2 | * | 7/2012 | Li et al. | 269/246 |
| 2002/0005608 | A1 | * | 1/2002 | Ausilio | 269/32 |
| 2002/0050674 | A1 | * | 5/2002 | Babchuk | 269/296 |
| 2005/0252947 | A1 | * | 11/2005 | Fujii et al. | 228/112.1 |
| 2010/0164158 | A1 | * | 7/2010 | Weissenborn | 269/101 |

* cited by examiner

POSITIONING AND PRESSING DEVICE, PRESSING DEVICE AND TOOL FOR AUXILIARY MACHINING OF MOTOR TRAIN UNDERFRAME

CROSS-REFERENCE TO RELATED APPLICATIONS

This application is a continuation of International Application No. PCT/CN2010/074795, filed on Jun. 30, 2010, which claims the priority benefit of China Patent Application No. 201010193436.9, filed on Jun. 4, 2010. The contents of the above identified applications are incorporated herein by reference in their entirety.

FIELD OF THE TECHNOLOGY

The present invention relates to field of a motor train machining tool, in particular to a positioning and pressing device, a pressing device and a tool for the auxiliary machining of a motor train underframe.

BACKGROUND

As an important part of a motor train, a motor train underframe is mainly formed by the auxiliary machining of a motor train underframe tool. Presently, the structure of the motor train underframe tool for the auxiliary machining of the motor train underframe is large in volume, so that the motor train underframe tool is not convenient for transportation and movement; and the adjustability thereof is not good and not capable of meeting the requirements of the auxiliary machining machining of the motor train underframes with different types.

SUMMARY

The present invention provides a positioning and pressing device, a pressing device and a tool for the auxiliary machining of the motor train underframe, which solves the technical problems of the present technology that the motor train underframe machining structure is large in volume and is not convenient for transportation and movement, and the adjustability thereof is not good and not capable of meeting the requirements of auxiliary machining of the motor train underframes with different types.

The present invention provides a positioning and pressing device for the auxiliary machining of the motor train underframe, comprising a crossbeam, two supporting frames, two rotary vertical pressing structures, a lateral positioning structure, a lateral holding structure and two adjustable intermediate supporting structures;

The two supporting frames are mounted in sliding manner on two sides of the upper surface of the crossbeam;

The two rotary vertical pressing structures are respectively mounted on the tops of the two supporting frames;

The lateral positioning structure is mounted on the side of one of the two supporting frames;

The lateral holding structure is mounted on the side of the other one of the two supporting frames; and The two adjustable intermediate supporting structures are mounted on the upper surface of the crossbeam and between the two supporting frames.

The present invention provides a pressing device for the auxiliary machining of the motor train underframe, comprising a crossbeam, two supporting frames, two rotary vertical pressing structures and two adjustable intermediate supporting structures;

The two supporting frames are mounted in sliding manner on two sides of the upper surface of the crossbeam;

The two rotary vertical pressing structures are respectively mounted on the tops of the two supporting frames;

The two adjustable intermediate supporting structures are mounted on the upper surface of the crossbeam and between the two supporting frames.

The present invention provides a tool for the auxiliary machining of the motor train underframe, comprising a plurality of abovementioned positioning and pressing devices; or a plurality of abovementioned positioning and pressing devices and a plurality of the abovementioned pressing devices.

The present invention provides a positioning and pressing device, a pressing device and a tool for the auxiliary machining of the motor train underframe, the motor train underframe can be positioned by the lateral positioning structure which is mounted on the side of one supporting frame of the positioning and pressing device, the motor train underframe can be clamped closely by the lateral holding structure on the side of the other supporting frame, the motor train underframe can be pressed closely by the two rotary vertical pressing structures on the tops of the two supporting frames, for different types of motor train underframe, the adjustable intermediate supporting structures can be adjusted to adapt to the motor train underframe to match the processed motor train underframe, furthermore, the motor train underframe can be pressed closely by assistance of a plurality of pressing devices, the tool for the auxiliary machining of the motor train underframe is modularized, and the present invention solves the technical problems of the present technology that the motor train underframe machining structure is large in volume and is not convenient for transportation and movement, and in addition, the adjustability thereof is not good and not capable of meeting the requirements of the auxiliary machining of the motor train underframe with different types.

DETAILED DESCRIPTION

Embodiment 1

Figure 1:
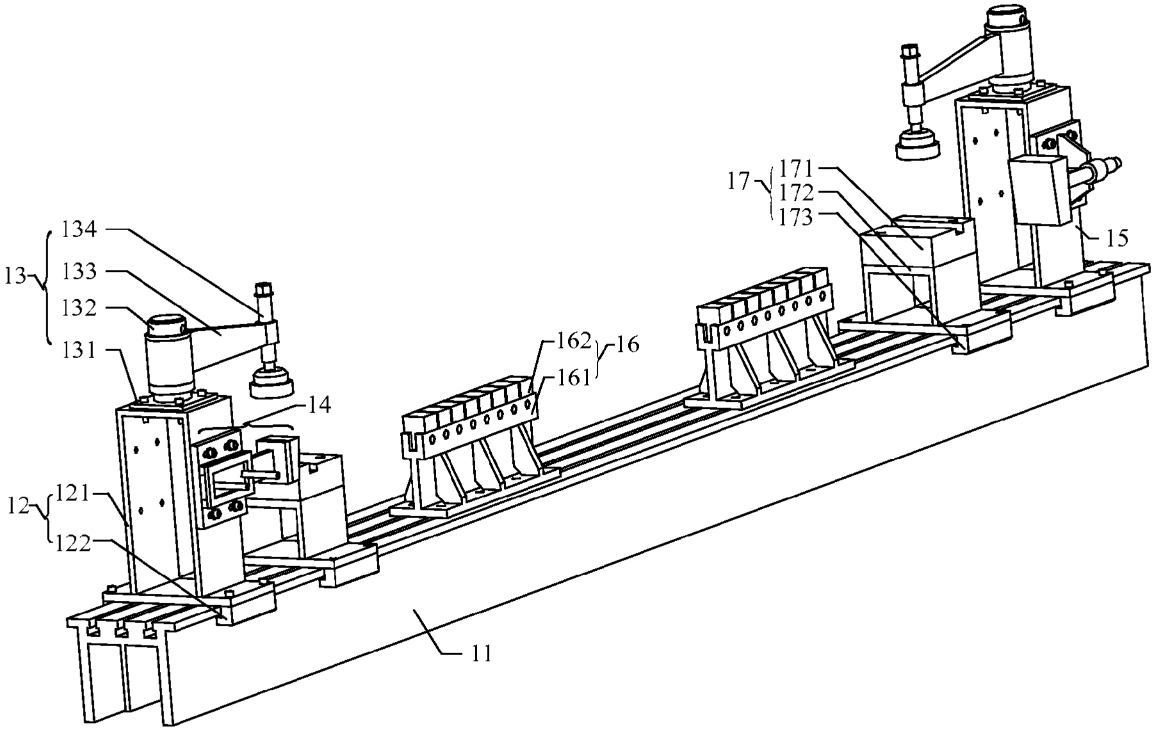
FIG. 1 is the solid figure of the positioning and pressing device for the auxiliary machining of the motor train underframe in the present invention.
Figure 2:
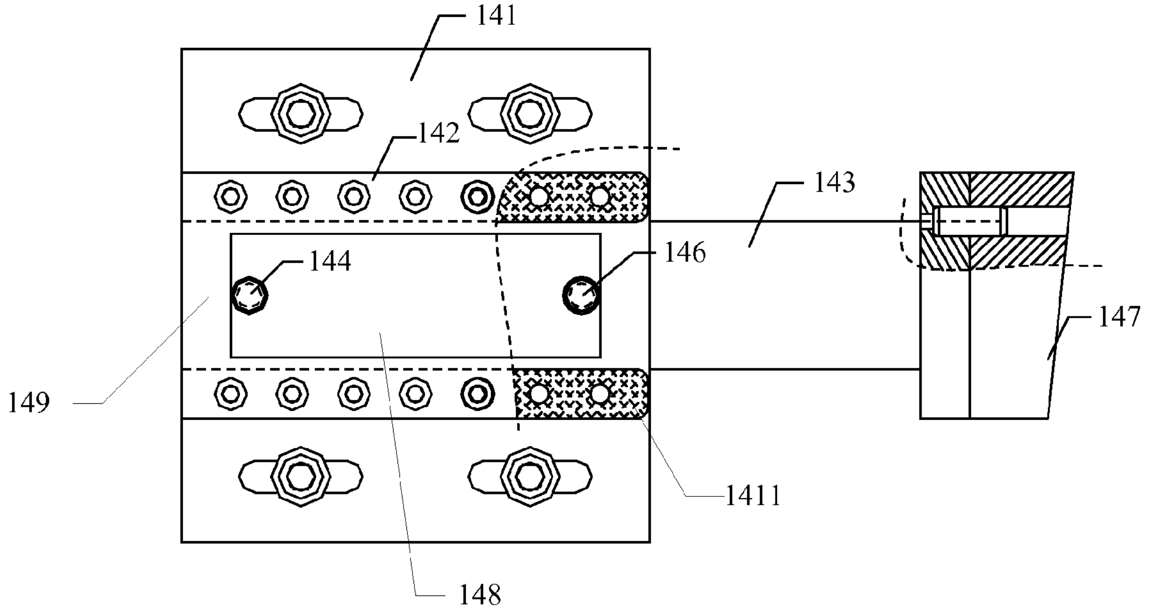
FIG. 2 is the front view of the lateral positioning structure of the positioning and pressing device of the present invention.
Figure 3:
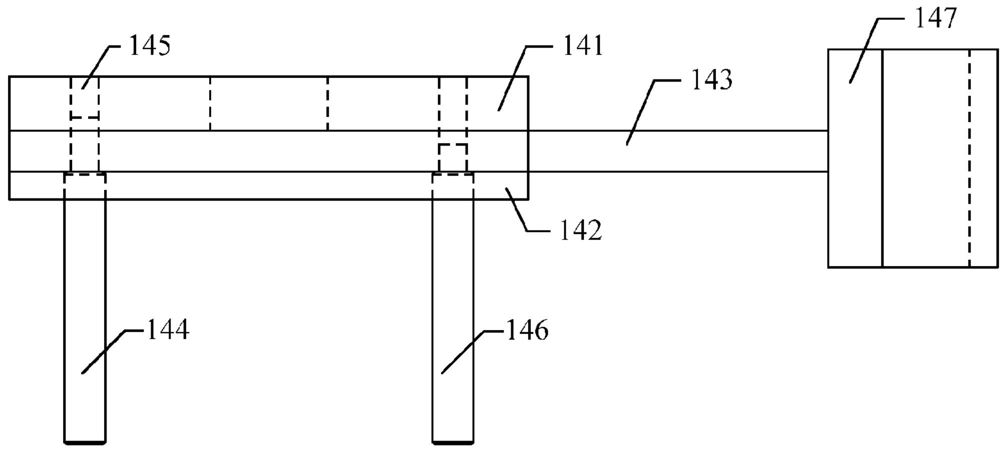
FIG. 3 is the top view of the lateral positioning structure of the positioning and pressing device of the present invention.
Figure 4:
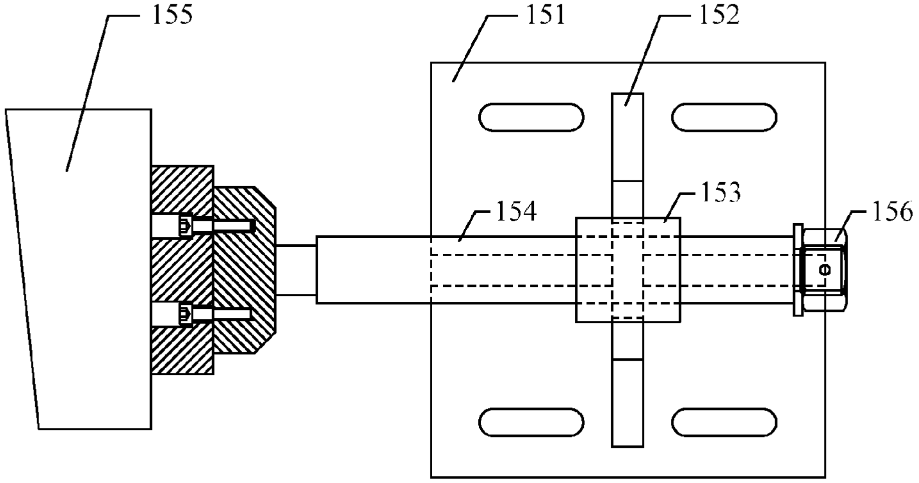
FIG. 4 is front view of the lateral holding structure of the positioning and pressing device of the present invention.
Figure 5:
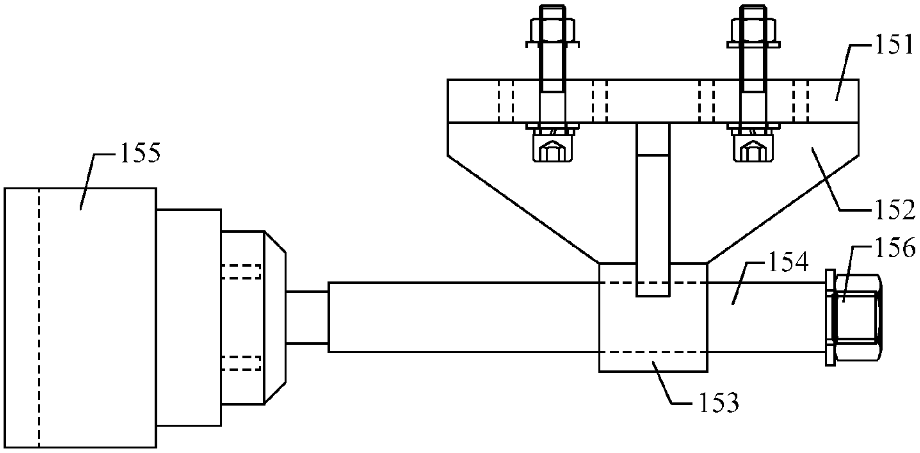
FIG. 5 is the top view of the lateral holding structure of the positioning and pressing device of the present invention.
Figure 6:
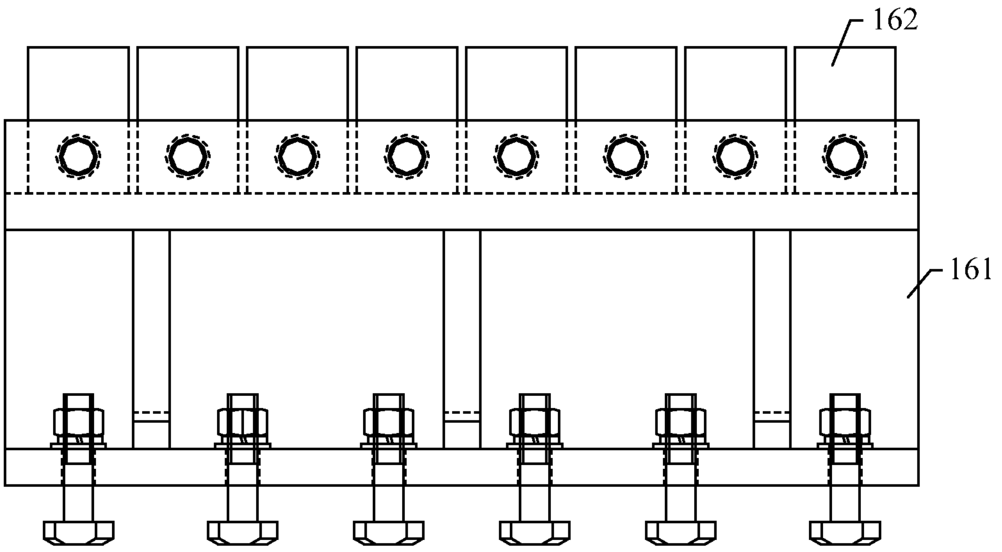
FIG. 6 is the front view of the adjustable intermediate supporting structure of the positioning and pressing device of the present invention.
Figure 7:
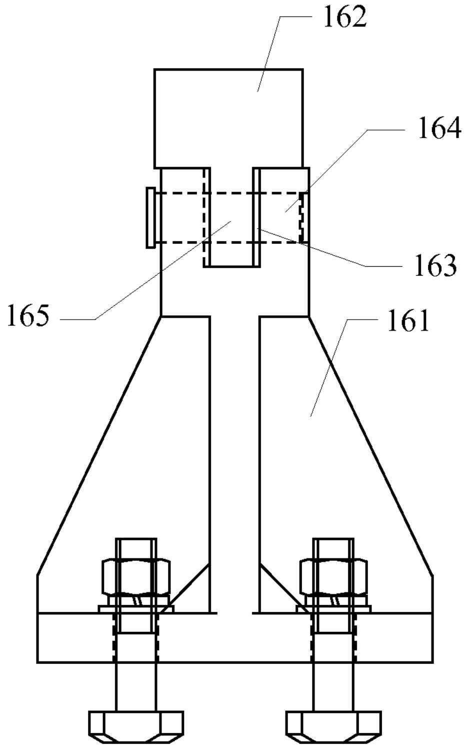
FIG. 7 is the side view of the adjustable intermediate supporting structure of the positioning and pressing device of the present invention.
Figure 8:
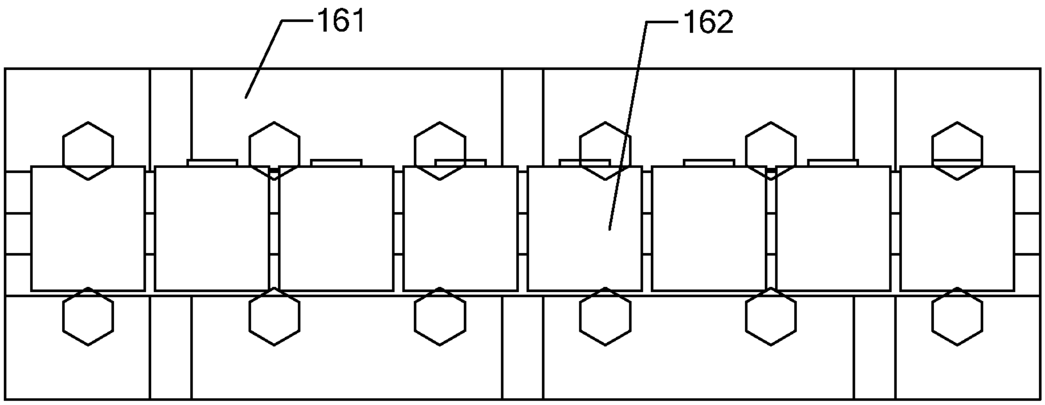
FIG. 8 is the top view of the adjustable intermediate supporting structure of the positioning and pressing device of the present invention.
Figure 9:
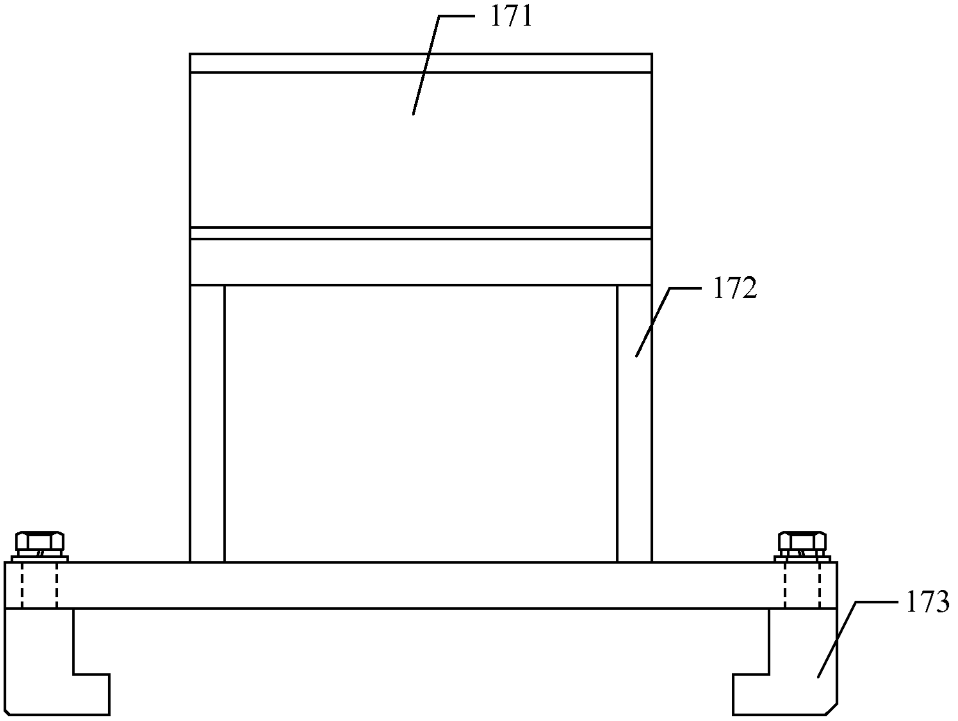
FIG. 9 is the front view of the vertical positioning structure of the positioning and pressing device of the present invention.
Figure 10:
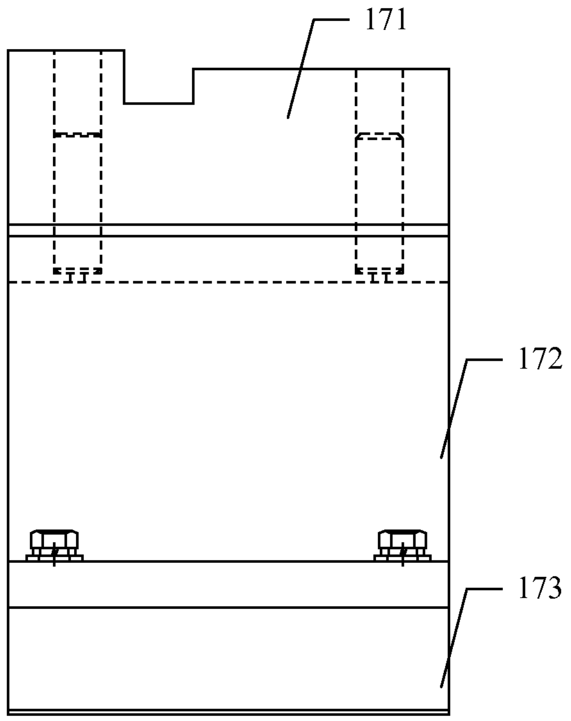
FIG. 10 is the side view of the vertical positioning structure of the positioning and pressing device of the present invention.
Figure 11:
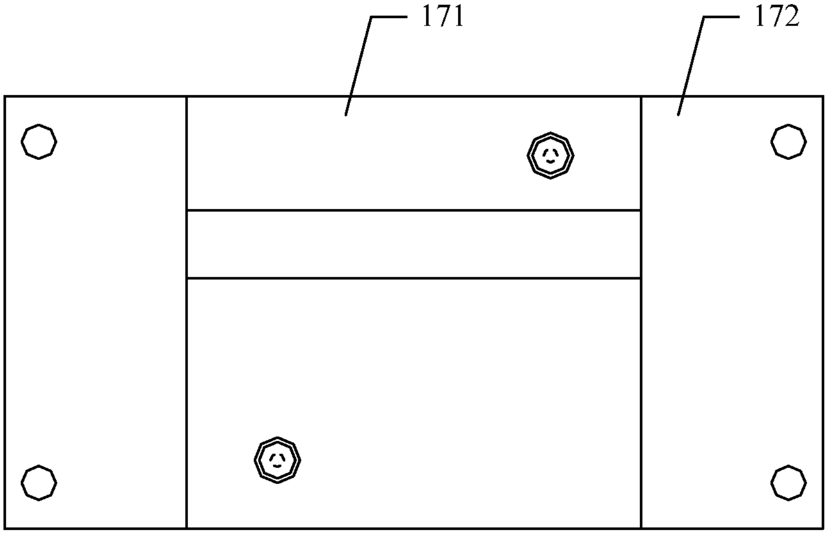
FIG. 11 is the top view of the vertical positioning structure in the positioning and pressing device of the present invention.
Figure 12:
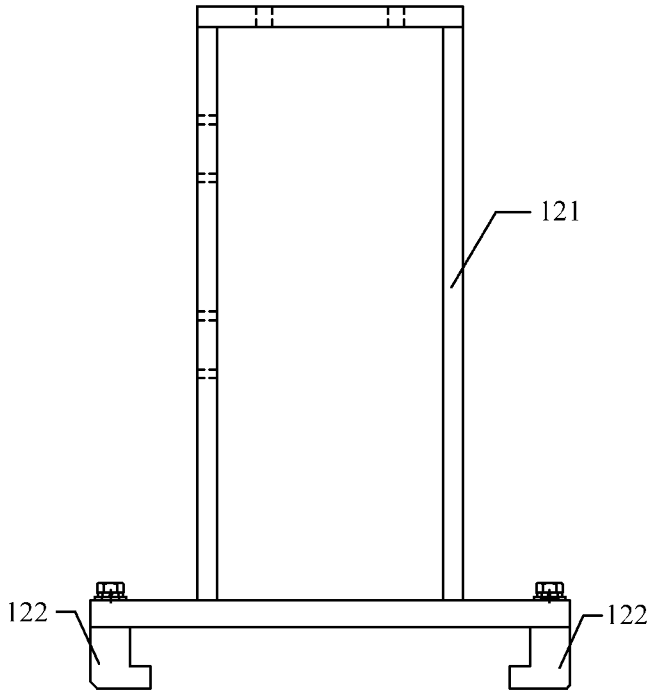
FIG. 12 is the front view of the supporting frames of the positioning and pressing device of the present invention.
Figure 13:
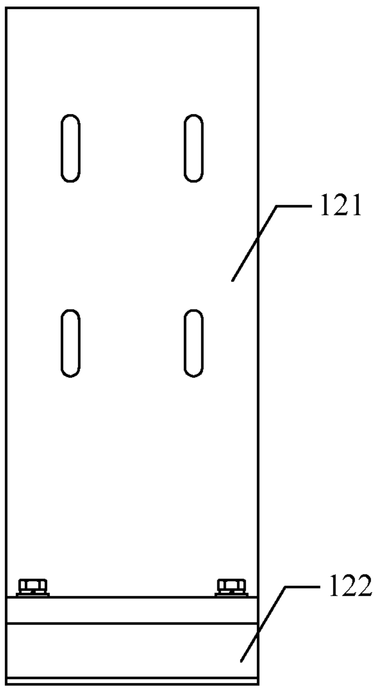
FIG. 13 is the side view of the supporting frames of the positioning and pressing device of the present invention.
Figure 14:
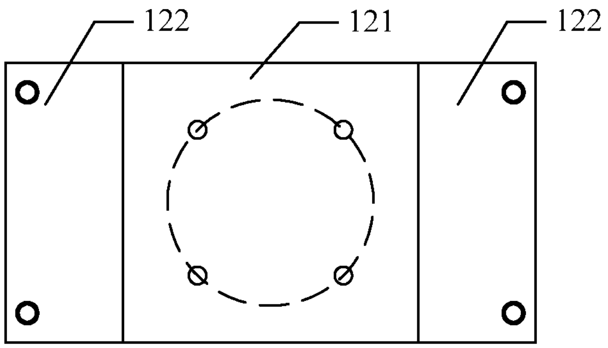
FIG. 14 is the top view of the supporting frames of the positioning and pressing device of the present invention.

FIG. 1 is the solid figure of the positioning and pressing device for the auxiliary machining of the motor train underframe in the present invention. FIG. 2 is the front view of the lateral positioning structure of the positioning and pressing device of the present invention. FIG. 3 is the top view of the lateral positioning structure of the positioning and pressing device of the present invention. FIG. 4 is front view of the lateral holding structure of the positioning and pressing device of the present invention. FIG. 5 is the top view of the lateral holding structure of the positioning and pressing device of the present invention. FIG. 6 is the front view of the adjustable intermediate supporting structure of the positioning and pressing device of the present invention. FIG. 7 is the side view of the adjustable intermediate supporting structure in the positioning and pressing device of the present invention. FIG. 8 is the top view of the adjustable intermediate supporting structure of the positioning and pressing device of the present invention. FIG. 9 is the front view of the vertical positioning structure of the positioning and pressing device of the present invention. FIG. 10 is the side view of the vertical positioning structure of the positioning and pressing device of the present invention. FIG. 11 is the top view of the vertical positioning structure of the positioning and pressing device of the present invention. FIG. 12 is the front view of the supporting frames of the positioning and pressing device of the present invention. FIG. 13 is the side view of the supporting frames of the positioning and pressing device of the present invention. FIG. 14 is the top view of the supporting frames of the positioning and pressing device of the present invention. As shown in FIGS. 1 to 14, the embodiment of positioning and pressing device for the auxiliary machining of the motor train underframe comprises a crossbeam 11, two supporting frames 12, two rotary vertical pressing structures 13, a lateral positioning structure 14, a lateral holding structure 15 and two adjustable intermediate supporting structures 16.

Wherein, the two supporting frames 12 are respectively mounted on two sides of the upper surface of the crossbeam 11, the two rotary vertical pressing structures 13 are respectively mounted in sliding manner on the tops of the two supporting frames 12, the lateral positioning structure 14 is mounted on the side of one of the two supporting frames 12, the lateral holding structure 15 is mounted on the side of the other one of the two supporting frames 12, and the two adjustable intermediate supporting structures 16 are mounted on the upper surface of the crossbeam 11 and between the two supporting frames 12.

Specifically, as shown in FIGS. 1, 12 and 14, the supporting frame 12 comprises a supporting frame body 121 and two first corrugated pressure plates 122; firstly, the supporting body 121 can be placed on the crossbeam 11, and then the two first corrugated pressure plates 122 can hold against two edges of the crossbeam 11 and be connected to the two sides of the lower surface of the supporting frame body 121 by bolts, so that the supporting frame body 121 can be mounted on the upper surface of the crossbeam 11; further, the bolts for fixing the two first corrugated pressure plates 122 on the supporting frame body 121 can be loosened, and at this time, the clearances of the two corrugated pressure plates 122 can be clamped on two edges of the crossbeam 11, so that the supporting frames 12 can be mounted in sliding manner on the crossbeam 11.

The rotary vertical pressing structure 13 comprises a base plate 131, a column 132, a rod arm 133 and a vertical pressing screw 134, the base plate 131 is fixedly connected to the top, which is the flat top of the supporting frame body 121, of the supporting frame 12 by bolts; the column 132 is vertically and fixedly connected to the base plate 131, one end of the rod arm 133 is hinged on the column 132, the vertical pressing screw 134 is adjustably threaded on the other end of the rod arm 133, before the motor train underframe is placed, the other end of the rod arm 133 can be rotated around the column 132, so that the rod arm 133 can be moved from the position which will hinder the installation of the motor train underframe; after the motor train underframe is placed in position, the other end of the rod arm 133 can be rotated around the column 132, so that the vertical pressing screw 134 can align with the motor train underframe; and the vertical pressing screw 134 can be screwed to press the edge beam of the motor train underframe.

As shown in FIGS. 1, 2 and 3, the lateral positioning structure 14 comprises a first holder 141, a hollow pressure plate 142, a positioning rod 143 and a plugging locating pin 144; the first holder 141 is fixedly connected to the side part, which is the side part of the supporting frame body, of the first supporting frame 12 by bolts, the first holder 141 is further equipped with a threaded hole 145, the hollow pressure plate 142 is mounted on the first holder 141 by division plates 1411 (not shown in FIGS. 1 to 3) and a track groove 149 (not shown in FIGS. 1 to 3) is formed by the hollow pressure plate 142 and the first holder 141; the positioning rod 143 is mounted in sliding manner in the track groove 149 and used for holding against a bevel positioning piece 147 on the side beam of motor train underframe so as to be connected with one end of the positioning rod by pins; the positioning rod 143 is equipped with a limiting threaded via hole (not shown in FIGS. 1 to 3), the plugging locating pin 144 can be throughout the hollow part 148 of the hollow pressure plate 142 and threaded with the limiting threaded via hole and the threaded hole 145 in turn, so as to limit the position of the positioning rod 142, therefore, the bevel positioning piece 147 can position the placed motor train underframe; furthermore, the positioning rod 143 throughout the hollow part 148 of the hollow pressure plate 142 is pivoted with a handle 146, the positioning rod 143 can slide in the track groove 149 by pushing or pulling the handle 146; in actual application, before the motor train underframe is placed, the plugging locating pin 144 can be screwed out from the limiting threaded via hole and the threaded hole 145, then, the handle 146 can be pulled to make the bevel positioning piece 147 approach the track groove 149 along with the positioning rod 143, so that the interference to the placing of the motor train underframe can be avoided; and at this moment, the lateral positioning structure 14 is in opening state; after the motor train underframe is placed and the position thereof is adjusted, the handle 146 can be pushed, so that the bevel positioning piece 147 can be far from the track groove 149 along with the positioning rod 143, the bevel positioning piece 147 can hold against the side beam of the motor train underframe, so as to position the motor train underframe; and at this moment, the lateral positioning structure 14 is in positioning state.

As shown in FIGS. 1, 4 and 5, the lateral holding structure 15 comprises a second holder 151, a bracket 152 and an adjustable pressing structure; the second holder 151 is fixedly connected to the side, which is the side of the supporting frame body 121, of the other supporting frame 12 by bolts; the bottom of the supporting frame 12 is fixedly connected to the second holder 151 by bolts; furthermore, the adjustable pressing structure comprises a thread bushing 153 and a bolt bar 154; the thread bushing 153 is mounted on the top of the bracket 152, the bolt bar 154 is adjustably threaded with the thread bushing 153, one end of the bolt bar 154 is equipped with a bevel cushion block 155 for holding against the motor train underframe, and the other end is equipped with a nut structure 156 for being gripped; in actual application, before the motor train underframe is placed, the nut structure 156 can be gripped to screw the bolt bar 154, so that the bevel cushion block 155 can approach the thread bushing 153 along with the bolt bar 154, therefore, the interference when placing of the motor train underframe can be avoided; at this moment, the lateral holding structure 15 is in loosening state; after the motor train underframe is placed, the position thereof is adjusted and the lateral positioning structure 14 is in positioning state, the nut structure 156 can be gripped to screw the bolt bar 154, so that the bevel cushion block 155 can be far from the thread bushing 153 along with the bolt bar 154, and the bevel cushion block 155 can hold against the side beam of the motor train underframe closely; and at this moment, the lateral holding structure 15 is in closely holding state.

As shown in FIGS. 1, 6 and 8, the adjustable intermediate supporting structure 16 comprises a supporting holder 161 and a plurality of T-shaped cushion blocks 162, the adjustable intermediate supporting structure is mainly used for supporting the floors of the motor train underframe; the supporting holder 161 is connected to the upper surface of the crossbeam 11 by bolts, the upper part of the supporting holder 161 is equipped with a U-shaped groove 163 along the axial direction of the crossbeam 11, two side plates of the U-shaped groove 163 are oppositely equipped with a plurality of first via holes 164 (not shown in FIG. 1 and FIGS. 6-8) at intervals; the vertical parts of the T-shaped cushion blocks 162 are equipped with second via holes 165 corresponding to the first via holes 164; after the T-shaped cushion blocks are respectively plugged in the U-shaped grooves 163, the T-shaped cushion blocks 162 can be connected with the U-shaped grooves by pins through the first via holes 164 in two side plates of the U-shaped grooves 163 and the second via holes 165 in the vertical parts of the T-shaped cushion blocks 162; and since the floors of the motor train underframe have height difference, the T-shaped cushion blocks 162 in different heights can be selected to be plugged in the U-shaped groove 163, so as to meet the requirements of supporting the floors of the motor train underframe.

Further, as shown in FIGS. 1, 9 and 11, the embodiment of positioning and pressing device for the auxiliary machining of the motor train underframe further comprises two vertical positioning structures 17, respectively mounted close to the two supporting frames; each vertical positioning structure 17 comprises a supporting holder and a positioning piece 171 for supporting the side beam and floors of the motor train underframe, the supporting holder comprises a supporting holder body 172 and two second corrugated pressure plates 173; firstly, the supporting holder body 172 can be placed on the crossbeam 11, and then the two second corrugated pressure plates 173 can hold against two edges of the crossbeam 11 and be connected to two sides of the lower surface of the supporting holder body 172 by bolts, so that the supporting frame body 121 can be mounted on the upper surface of the crossbeam 11; further, the bolts for connecting the two second corrugated pressure plates 173 to the supporting holder body 172 can be loosened, and the clearances of the two corrugated pressure plates 173 can be clamped on two edges of the crossbeam 11, so that the supporting holder body 172 can be mounted in sliding manner on the crossbeam 11, and the positioning piece 171 is connected to the upper part of the supporting holder body 172 by bolts.

In actual application, a plurality of positioning and pressing devices for the auxiliary machining of the motor train underframe in this embodiment can be applied to position and clamp the motor train underframe, in process as follows: before the motor train underframe is placed, the distance between the two supporting frames 12, between the vertical positioning structures 17 and between the supporting frames 12 and the vertical positioning structures 17 can be adjusted according to the relevant sizes of the motor train underframe, then, the T-shaped cushion blocks 162 in proper height can be selected and inserted in the U-shaped groove, so that they are connected with each other by pins; meanwhile, the lateral positioning structure 14 can be in opening state, and the lateral holding structure 15 can be in loosening state; and the motor train underframe can be placed, then, the two vertical positioning structures 17 can hold against the side beam and floors on each side of the motor train underframe, and the position of the motor train underframe can be adjusted properly; finally, after the lateral positioning structure 14 is in positioning state, the lateral holding structure 15 can be in holding state, and the rotary vertical pressing structure 13 can press the side beams of the motor train underframe, so that the motor train underframe can be positioned and pressed.

In the embodiment of positioning and pressing device for the auxiliary machining of the motor train underframe, the motor train underframe can be positioned by the lateral positioning structure mounted on the side of one supporting frame on the positioning and pressing device, the motor train underframe can be clamped closely by the lateral holding structure on the side of the other supporting frame; the motor train underframe can be pressed closely by two rotary vertical pressing structures on the tops of the two supporting frames, for different types of motor train underframe, the adjustable intermediate supporting structures can be adjusted to adapt to the motor train underframe to be processed, furthermore, the motor train underframe can be pressed closely by assistance of a plurality of pressing devices, the tool for the auxiliary machining of the motor train for the auxiliary machining of the motor train underframe is modularized, and the present invention solves the technical problems of the present technology that the motor train underframe machining structure is large in volume and is not convenient for transportation and movement and the adjustability thereof is not good and not capable of meeting the requirements of the auxiliary machining of the motor train underframe with different types.

Embodiment 2

Figure 15:
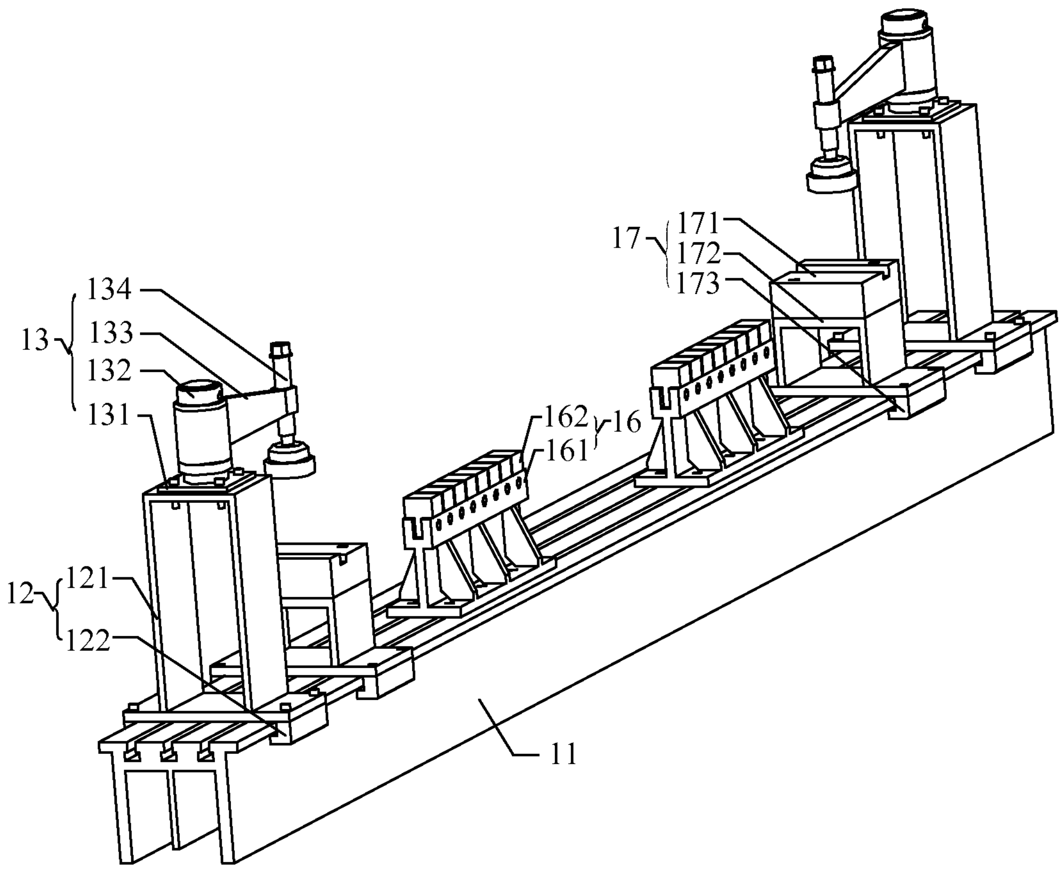
FIG. 15 is the solid figure of the pressing device for the auxiliary machining of the motor train underframe in the present invention.

FIG. 15 is the solid figure of the pressing device for the auxiliary machining of the motor train underframe. As shown in FIGS. 1 to 15, the difference between the pressing device of this embodiment and the positioning and pressing device of embodiment 1 is that the pressing device of this embodiment does not have lateral positioning structure 14 and lateral holding structure 15, and the remaining structures are the same as the positioning and pressing devices, and therefore the remaining structures are not described again herein.

Embodiment 3

Figure 16:
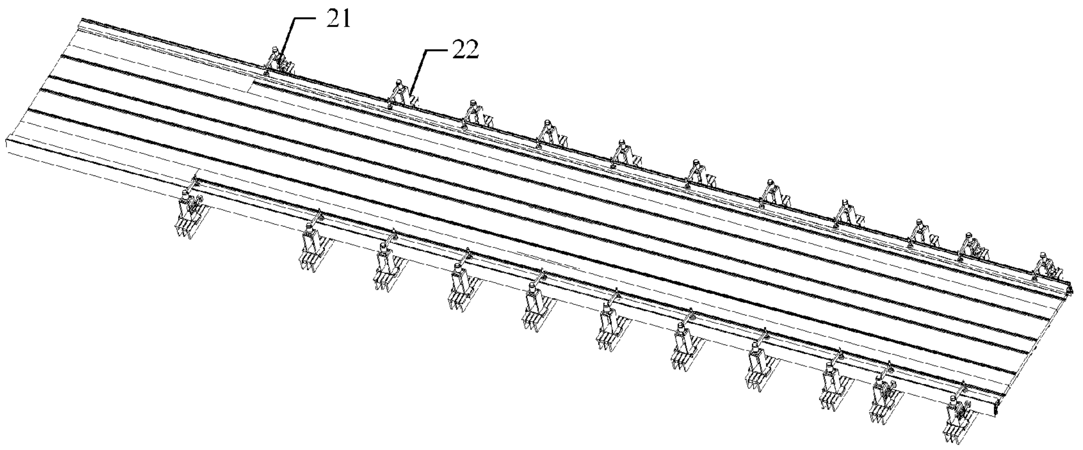
FIG. 16 is the schematic diagram that the motor train underframe is clamped by the tool for auxiliary machining of the motor train underframe in the present invention.

Further, this embodiment of the tool for the auxiliary machining of the motor train underframe comprises a plurality of positioning and pressing devices stated in the embodiment 1; or a plurality of positioning and pressing devices stated in the embodiment 1 and a plurality of pressing devices stated in the embodiment 2, and furthermore, the places of the tool corresponding to two ends of the motor train underframe can be equipped with at least one positioning and pressing device. Specifically, FIG. 16 is the schematic diagram that the tool for the auxiliary machining of the motor train underframe clamps the motor train underframe. As shown in FIG. 16, the tool for the auxiliary machining of the motor train underframe of this embodiment comprises three positioning and pressing devices 21 stated in embodiment 1 and eight pressing devices 22 stated in embodiment 2, which are used to clamp the motor train underframe to be processed, wherein, the end of the tool corresponding to the motor train underframe is equipped with one positioning and pressing device 21, and the other end is equipped with two positioning and pressing devices 21, the eight pressing devices 22 are arranged between two positioning and pressing devices 21 with large distance; and generally, the distance between adjacent positioning devices and/or positioning and pressing devices should be basically equal.

Further, the end of the tool corresponding to the motor train underframe can also be equipped with one positioning and pressing device 21, and the other end can be equipped with one positioning and pressing device 21; the middle position between the two positioning and pressing devices 21 can be equipped with one positioning and pressing device 21; and the eight pressing devices 22 can be divided into two groups, four pressing device 22 are in one group, and evenly arranged among the three positioning and pressing devices 21.

According to the tool for the auxiliary machining of the motor train underframe of the embodiment, the motor train underframe can be positioned by the lateral positioning structure on the side of one supporting frame on the positioning and pressing device, the motor train underframe can be clamped closely by the lateral holding structure on the side of the other supporting frame, the motor train underframe can be pressed closely by two rotary vertical pressing structures on the tops of the two supporting frames, for different types of motor train underframe, the adjustable intermediate supporting structures can be adjusted to adapt to the motor train underframe to be processed, furthermore, the motor train underframe can be pressed closely by assistance of a plurality of pressing devices, the tool for the auxiliary machining of the motor train underframe is modularized, and the present invention solves the technical problems of the present technology that the motor train underframe machining structure is large in volume and is not convenient for transportation and movement and the adjustability thereof is not good and not capable of meeting the requirements of the auxiliary machining of the motor train underframe with different types.

Finally, it should noted that the above embodiments are merely provided for describing the technical solutions of the present invention, but not intended to limit the present invention. It should be understood by those of ordinary skill in the art that although the present invention has been described in detail with reference to the foregoing embodiments, modifications can be made to the technical solutions described in the foregoing embodiments, or equivalent replacements can be made to some technical features in the technical solutions, as long as such modifications or replacements do not cause the essence of corresponding technical solutions to depart from the scope of the present invention.

What is claimed is:

1. A positioning and pressing device for auxiliary machining of the motor train underframe characterized in that it comprises a crossbeam, two supporting frames, two rotary vertical pressing structures, a lateral positioning structure, a lateral holding structure and two adjustable intermediate supporting structures;

wherein; the two supporting frames are mounted in sliding manner on two sides of a upper surface of the crossbeam, the two rotary vertical pressing structures are respectively mounted on the tops of the two supporting frames, the lateral positioning structure is mounted on the side of one of the two supporting frames, the lateral holding structure is mounted on the side of the other one of the two supporting frames, and the two adjustable intermediate supporting structures are mounted on the upper surface of the crossbeam and between the two supporting frames;

the adjustable intermediate supporting structure comprises a supporting holder and a plurality of T-shaped cushion blocks;

the supporting holder is connected to the upper surface of the crossbeam by bolts, a upper part of the supporting holder is equipped with a U-shaped groove along the axial direction of the crossbeam, two side plates of the U-shaped groove are oppositely equipped with a plurality of first via holes at intervals; and the vertical parts of the T-shaped cushion blocks are equipped with second via holes corresponding to the first via holes, a plurality of T-shaped cushion blocks are respectively inserted in the U-shaped groove and connected with the U-shaped groove by pins through the first via holes in two side plates of the U-shaped groove and the second via holes in the vertical parts of the T-shaped cushion blocks.

2. The positioning and pressing device according to claim 1, characterized in that the supporting frame comprises a supporting frame body and two first corrugated pressure plates;

the two first corrugated pressure plates are connected to the two sides of a lower surface of the supporting frame body by bolts; and the supporting frame body is clamped on edges of the crossbeam by the two first corrugated pressure plates and therefore the supporting frame body is mounted on the upper surface of the crossbeam.

3. The positioning and pressing device according to claim 1, characterized in that the rotary vertical pressing structure comprises a base plate, a column, a rod arm and a vertical pressing screw; and the base plate is fixedly connected to the top of the supporting frame, the column is vertically and fixedly connected to the base plate, one end of the rod arm is hinged with the column, and the vertical pressing screw is adjustably threaded with the other end of the rod arm.

4. The positioning and pressing device according to claim 1, characterized in that the lateral positioning structure comprises a first holder, a hollow pressure plate, a positioning rod and a plugging locating pin;

the first holder is fixedly connected to the side part of the first supporting frame, and the first holder is equipped with a threaded hole;

the hollow pressure plate is mounted on the first holder and a track groove is formed by the hollow pressure plate and the first holder;

the positioning rod is mounted in sliding manner in the track groove, one end of the positioning rod is equipped with a bevel positioning piece for holding against the motor train underframe, and the positioning rod is equipped with a limiting threaded via hole; and when the lateral positioning structure is in positioning state, the plugging locating pin is placed through a hollow part of the hollow pressure plate and threaded into the limiting threaded via hole and the threaded hole.

5. The positioning and pressing device according to claim 4, characterized in that the lateral positioning structure further comprises a handle, the handle is placed through the hollow part of the hollow pressure plate and is fixedly connected to the positioning rod.

6. The positioning and pressing device according to claim 1, characterized in that the lateral holding structure comprises a second holder, a bracket and an adjustable pressing structure;

the second holder is fixedly connected to the side of the other supporting frame; and the bottom of the bracket is fixedly connected to the second holder; and the adjustable pressing structure comprises a thread bushing and a bolt bar, the thread bushing is mounted on the top of the bracket, the bolt bar is adjustably threaded with the thread bushing, and one end of the bolt bar is equipped with a bevel cushion block for holding against the motor train underframe.

7. The positioning and pressing device according to claim 1, characterized in that it further comprises two vertical positioning structures;

each vertical positioning structure comprises a supporting holder and a positioning piece for supporting one side beam and floors of the motor train underframe, the positioning piece is connected to a upper part of the supporting holder by pins; and the supporting holder comprises a supporting holder body and two corrugated pressure plates, the two corrugated pressure plates are connected to two sides of a lower surface of the supporting holder body by bolts, and the supporting holder body is clamped on edges of the crossbeam by the two corrugated pressure plates and mounted close to the two supporting frames.

8. A pressing device for auxiliary machining of motor train underframe, characterized in that it comprises a crossbeam, two supporting frames, two rotary vertical pressing structures and two adjustable intermediate supporting structures;

wherein; the supporting structures are mounted in sliding manner on two sides of the upper surface of the crossbeam, the two rotary vertical pressing structures are respectively mounted on the tops of the two supporting frames, and the two adjustable intermediate supporting structures are mounted on the upper surface of the crossbeam and between the two supporting frames;

the adjustable intermediate supporting structure comprises a supporting holder and a plurality of T-shaped cushion blocks;

the supporting holder is connected to the upper surface of the crossbeam by bolts, a upper part of the supporting holder is equipped with a U-shaped groove along the axial direction of the crossbeam, two side plates of the U-shaped groove are oppositely equipped with a plurality of first via holes at intervals; and the vertical parts of the T-shaped cushion blocks are equipped with second via holes corresponding to the first via holes, a plurality of T-shaped cushion blocks are respectively inserted in the U-shaped groove and connected with the U-shaped groove by pins through the first via holes in two side plates of the U-shaped groove and the second via holes in the vertical parts of the T-shaped cushion blocks.

9. The pressing device according to claim 8, characterized in that the supporting frame comprises a supporting frame body and two second corrugated pressure plates, the two second corrugated pressure plates are connected to the two sides of a lower surface of the supporting frame body by bolts; and the supporting frame body is clamped on edges of the crossbeam by the two second corrugated pressure plates and the supporting frame body is mounted on two sides of the upper surface of the crossbeam.

10. The pressing device according to claim 8, characterized in that the rotary vertical pressing structure comprises a base plate, a column, a rod arm and a vertical pressing screw;

the base plate is fixedly connected to the top of the supporting frame; the column is vertically and fixedly connected to the base plate, and one end of the rod arm is hinged with the column, and the vertical pressing screw is adjustably threaded with the other end of the rod arm.

11. The pressing device according to claim 8, characterized in that the device further comprises two vertical positioning structures;

each vertical positioning structure comprises a supporting holder and a positioning piece for supporting one side beam and floors of the motor train underframe, the positioning piece is connected to a upper part of the supporting holder by pins; and the supporting holder comprises a supporting holder body and two corrugated pressure plates, the two corrugated pressure plates are connected to two sides of a lower surface of the supporting holder body by bolts; and the supporting holder body is clamped on edges of the crossbeam by the two corrugated pressure plates and mounted close to the two supporting frames.

12. A tool for auxiliary machining of motor train underframe, comprising a plurality of positioning and pressing devices, wherein the positioning and pressing device comprises a crossbeam, two supporting frames, two rotary vertical pressing structures, a lateral positioning structure, a lateral holding structure and two adjustable intermediate supporting structures;

wherein; the two supporting frames are mounted in sliding manner on two sides of a upper surface of the crossbeam, the two rotary vertical pressing structures are respectively mounted on the tops of the two supporting frames, the lateral positioning structure is mounted on the side of one of the two supporting frames, the lateral holding structure is mounted on the side of the other one of the two supporting frames, and the two adjustable intermediate supporting structures are mounted on the upper surface of the crossbeam and between the two supporting frames;

the adjustable intermediate supporting structure comprises a supporting holder and a plurality of T-shaped cushion blocks;

the supporting holder is connected to the upper surface of the crossbeam by bolts, a upper part of the supporting holder is equipped with a U-shaped groove along the axial direction of the crossbeam, two side plates of the U-shaped groove are oppositely equipped with a plurality of first via holes at intervals; and the vertical parts of the T-shaped cushion blocks are equipped with second via holes corresponding to the first via holes, a plurality of T-shaped cushion blocks are respectively inserted in the U-shaped groove and connected with the U-shaped groove by pins through the first via holes in two side plates of the U-shaped groove and the second via holes in the vertical parts of the T-shaped cushion blocks.

13. The tool for auxiliary machining of motor train underframe according to claim 12, characterized in that the positions of the tool corresponding to two ends of the motor train underframe are equipped with at least one of the plurality of positioning and pressing devices.

14. The tool for auxiliary machining of motor train underframe according to claim 12, further comprising a plurality of pressing devices, wherein the pressing device comprises a crossbeam, two supporting frames, two rotary vertical pressing structures and two adjustable intermediate supporting structures;

wherein; the supporting structures are mounted in sliding manner on two sides of the upper surface of the crossbeam, the two rotary vertical pressing structures are respectively mounted on the tops of the two supporting frames, and the two adjustable intermediate supporting structures are mounted on the upper surface of the crossbeam and between the two supporting frames;

the adjustable intermediate supporting structure comprises a supporting holder and a plurality of T-shaped cushion blocks;

the supporting holder is connected to the upper surface of the crossbeam by bolts, a upper part of the supporting holder is equipped with a U-shaped groove along the axial direction of the crossbeam, two side plates of the U-shaped groove are oppositely equipped with a plurality of first via holes at intervals; and the vertical parts of the T-shaped cushion blocks are equipped with second via holes corresponding to the first via holes, a plurality of T-shaped cushion blocks are respectively inserted in the U-shaped groove and connected with the U-shaped groove by pins through the first via holes in two side plates of the U-shaped groove and the second via holes in the vertical parts of the T-shaped cushion blocks.

15. A positioning and pressing device for auxiliary machining of the motor train underframe characterized in that it comprises a crossbeam, two supporting frames, two rotary vertical pressing structures, a lateral positioning structure, a lateral holding structure and two adjustable intermediate supporting structures;

wherein; the two supporting frames are mounted in sliding manner on two sides of a upper surface of the crossbeam, the two rotary vertical pressing structures are respectively mounted on the tops of the two supporting frames, the lateral positioning structure is mounted on the side of one of the two supporting frames, the lateral holding structure is mounted on the side of the other one of the two supporting frames, and the two adjustable intermediate supporting structures are mounted on the upper surface of the crossbeam and between the two supporting frames;

the lateral positioning structure comprises a first holder, a hollow pressure plate, a positioning rod and a plugging locating pin;

the first holder is fixedly connected to the side part of the first supporting frame, and the first holder is equipped with a threaded hole;

the hollow pressure plate is mounted on the first holder and a track groove is formed by the hollow pressure plate and the first holder;

the positioning rod is mounted in sliding manner in the track groove, one end of the positioning rod is equipped with a bevel positioning piece for holding against the motor train underframe, and the positioning rod is equipped with a limiting threaded via hole; and when the lateral positioning structure is in positioning state, the plugging locating pin is placed through a hollow part of the hollow pressure plate and threaded into the limiting threaded via hole and the threaded hole.

16. The positioning and pressing device according to claim 15, characterized in that the supporting frame comprises a supporting frame body and two first corrugated pressure plates;

the two first corrugated pressure plates are connected to the two sides of a lower surface of the supporting frame body by bolts; and the supporting frame body is clamped on edges of the crossbeam by the two first corrugated pressure plates and therefore the supporting frame body is mounted on the upper surface of the crossbeam.

17. The positioning and pressing device according to claim 15, characterized in that the rotary vertical pressing structure comprises a base plate, a column, a rod arm and a vertical pressing screw; and the base plate is fixedly connected to the top of the supporting frame, the column is vertically and fixedly connected to the base plate, one end of the rod arm is hinged with the column, and the vertical pressing screw is adjustably threaded with the other end of the rod arm.

18. The positioning and pressing device according to claim 15, characterized in that the lateral positioning structure further comprises a handle, the handle is throughout the hollow part of the hollow pressure plate and is fixedly connected to the positioning rod.

19. The positioning and pressing device according to claim 15, characterized in that the lateral holding structure comprises a second holder, a bracket and an adjustable pressing structure;

the second holder is fixedly connected to the side of the other supporting frame; and the bottom of the bracket is fixedly connected to the second holder; and the adjustable pressing structure comprises a thread bushing and a bolt bar, the thread bushing is mounted on the top of the bracket, the bolt bar is adjustably threaded with the thread bushing, and one end of the bolt bar is equipped with a bevel cushion block for holding against the motor train underframe.

20. The positioning and pressing device according to claim 15, characterized in that it further comprises two vertical positioning structures;

each vertical positioning structure comprises a supporting holder and a positioning piece for supporting one side beam and floors of the motor train underframe, the positioning piece is connected to a upper part of the supporting holder by pins; and the supporting holder comprises a supporting holder body and two corrugated pressure plates, the two corrugated pressure plates are connected to two sides of a lower surface of the supporting holder body by bolts, and the supporting holder body is clamped on edges of the cross-beam by the two corrugated pressure plates and mounted close to the two supporting frames.

* * * * *